United States Patent
Baumer

(10) Patent No.: US 6,454,835 B1
(45) Date of Patent: Sep. 24, 2002

(54) TWO-PHASE FLOW SEPARATOR

(75) Inventor: Michael F. Baumer, Dayton, OH (US)

(73) Assignee: Scitex Digital Printing, Inc.

( * ) Notice: Subject to any disclaimer, the term of this patent is extended or adjusted under 35 U.S.C. 154(b) by 0 days.

(21) Appl. No.: 09/587,072

(22) Filed: Jun. 2, 2000

(51) Int. Cl.$^7$ .............................................. B01D 19/02
(52) U.S. Cl. ................. 95/19; 95/175; 95/242; 96/179; 96/156; 96/193; 347/92
(58) Field of Search ..................... 95/157, 175, 19, 95/242; 96/176, 179, 156, 193; 347/92

(56) References Cited

U.S. PATENT DOCUMENTS

| 4,256,470 A | * | 3/1981 | Zajicek et al. | ................. 95/242 |
| 4,931,072 A | * | 6/1990 | Striedieck | ..................... 92/242 |

FOREIGN PATENT DOCUMENTS

| DE | 4114679 | * | 11/1992 | ................... 95/242 |
| JP | 3-207 372 | * | 9/1991 | |
| JP | 5-277304 | * | 10/1993 | ................... 95/30 |

* cited by examiner

Primary Examiner—Robert A. Hopkins
(74) Attorney, Agent, or Firm—Barbara Joan Haushalter

(57) ABSTRACT

A method and apparatus is provided for separating the liquid and non-liquid components of a foamy mixture. The apparatus comprises a filter through which the liquid portion of the foam can pass and through which the gaseous or air component cannot pass, unless a pressure differential across the filter exceeds the bubble point of the filter. Foam is supplied to a first side of the filter. The liquid component of the foam is removed from the second side of the filter, and the gaseous component of the foam from the first side of the filter. A pressure differential is established between the two sides of the filter to cause the liquid component of the foam to pass through the filter; but the pressure differential across the filter is prevented from exceeding the bubble point of the filter to prevent the gaseous component of the foam from passing through the filter.

9 Claims, 4 Drawing Sheets

TWO-PHASE FLOW SEPARATOR

TECHNICAL FIELD

The present invention relates to the separation of foam into liquid and air and more particularly to the control of the separating the liquid and gas phase of foam.

BACKGROUND ART

Foam consists of a large number of air bubbles having thin walls of liquid. In foaming liquids, the presence of surfactants in the liquid causes the liquid to resist draining out of the bubble walls. The surface tension of the liquid films resists the rupturing of the walls. As a result of gravity and other driving forces, however, the liquid will slowly drain from the bubble wall until it becomes sufficiently thin that the bubble walls become brittle and rupture.

Many fields require the separation of foam into liquid and air, such as biotechnology in controlling foam in bubble columns and of ink jet technology in controlling foam in the fluid system ink supply tank.

Foam is created in continuous ink jet fluid systems due to the fact that not all ink drops are used for printing. The unused ink drops are returned to the fluid system under vacuum through a catcher. The ink and air are mixed at the catcher and in the fluid lines. which return the two phase flow (foam) to the ink supply tank. In some cases, the foam can build up in the ink supply tank and eventually be evacuated into the vacuum system. Damage can then occur to the vacuum system.

Some prior art means of controlling foam, or defoamers, exist. For example, chemicals can be added to the fluid which lowers the stability of the bubble walls. However, these can have an undesirable effect on the performance of the liquid in an ink jet printing application, by changing the ink formulation and parameters.

Mechanical defoamers, such as described in U.S. Pat. No. 4,657,677, issued to Roubicek et al, break the foam by stretching and deforming the bubble walls until they rupture. This might be done by means of a rotating disk, cones or other means, or to some extent by the flow of the foam down a ramp. While non-rotating methods do not break the foam rapidly enough in all cases given the size design constraints. rotating designs require moving parts which may be subject to failure and the cost of an extra motor.

Thermal defoamers heat the fluid above a critical temperature at which drainage of the fluid from the bubble walls increases dramatically. In ink jet systems, as well as other systems, the temperatures required can cause unacceptable break down of the fluid.

It is seen, therefore, that it would be desirable to have an improved means for separating the liquid and gas phase of foam.

SUMMARY OF THE INVENTION

The present invention provides an improved mechanical means of separating the liquid and gas phases of foam. The two phase flow separator of the present invention can be applied for use in any field which requires the separation of foam into liquid and air.

In accordance with one aspect of the present invention, an apparatus is provided for separating the liquid and gaseous components of a foamy mixture. The apparatus comprises a filter means through which the liquid portion of the foam can pass and through which the gaseous component cannot pass, unless a pressure differential across the filter exceeds the bubble point of the filter. First means are provided to supply the foam to a first side of the filter means. Additional means are provided to remove the liquid component of the foam from the second side of the filter, and the gaseous component of the foam from the first side of the filter. A pressure differential is established between the two sides of the filter to cause the liquid component of the foam to pass through the filter; but the pressure differential across the filter is prevented from exceeding the bubble point of the filter to prevent the gaseous component of the foam from passing through the filter.

Other objects and advantages of the invention will be apparent from the following description and the appended claims.

DETAILED DESCRIPTION OF THE INVENTION

Figure 1:
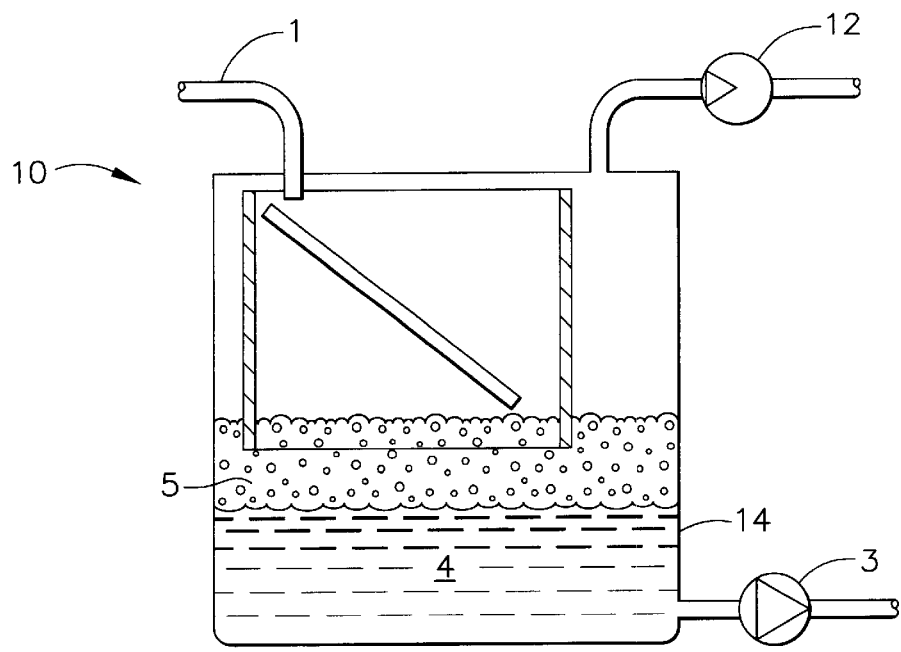
FIG. 1 is a prior art schematic block diagram of a portion of a continuous ink jet fluid system showing subsystems involved in the production and reduction of foam in the ink tank.
Figure 2:
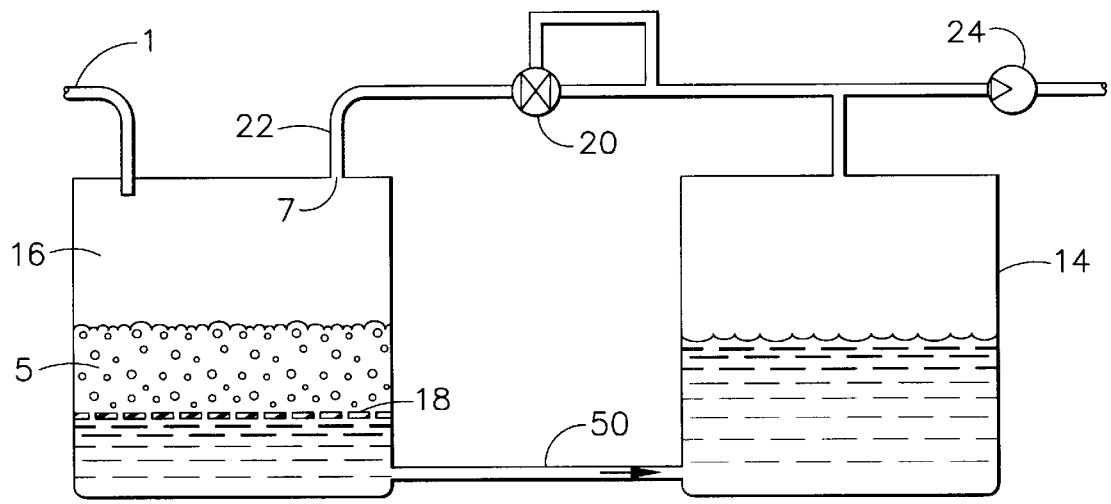
FIG. 2 is a schematic block diagram showing a modification of the block diagram in FIG. 1 to include a two phase flow separating device.
Figure 4:
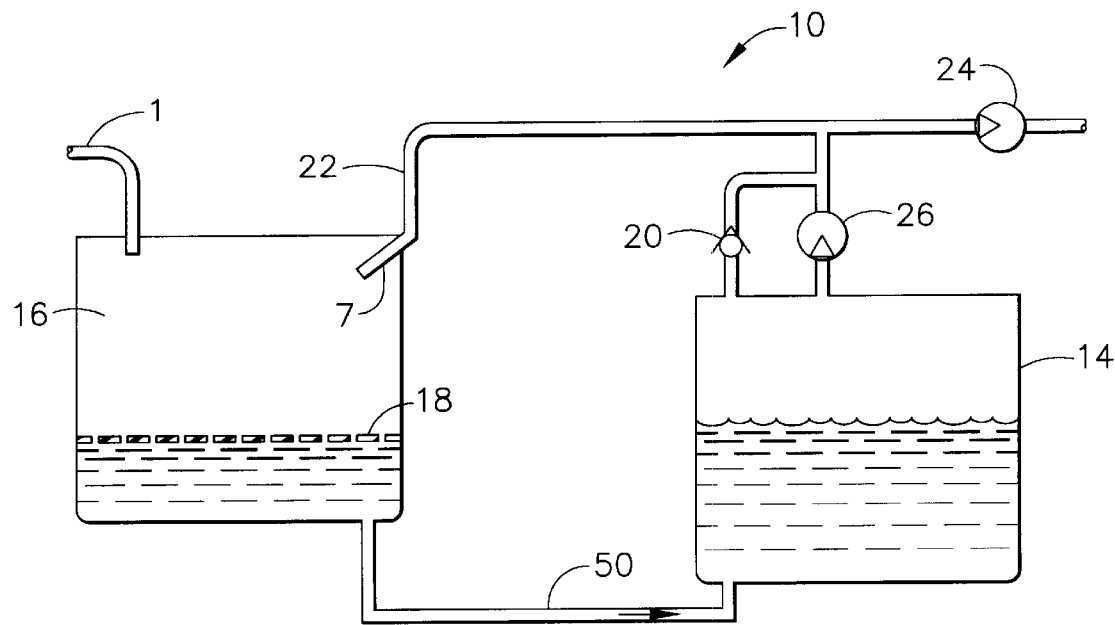
FIGS. 4, 5, 6 and 7 are fluid system schematics showing the use of other configurations of fluid system components to maintain a pressure differential across the two phase flow separation screen.
Figure 6:
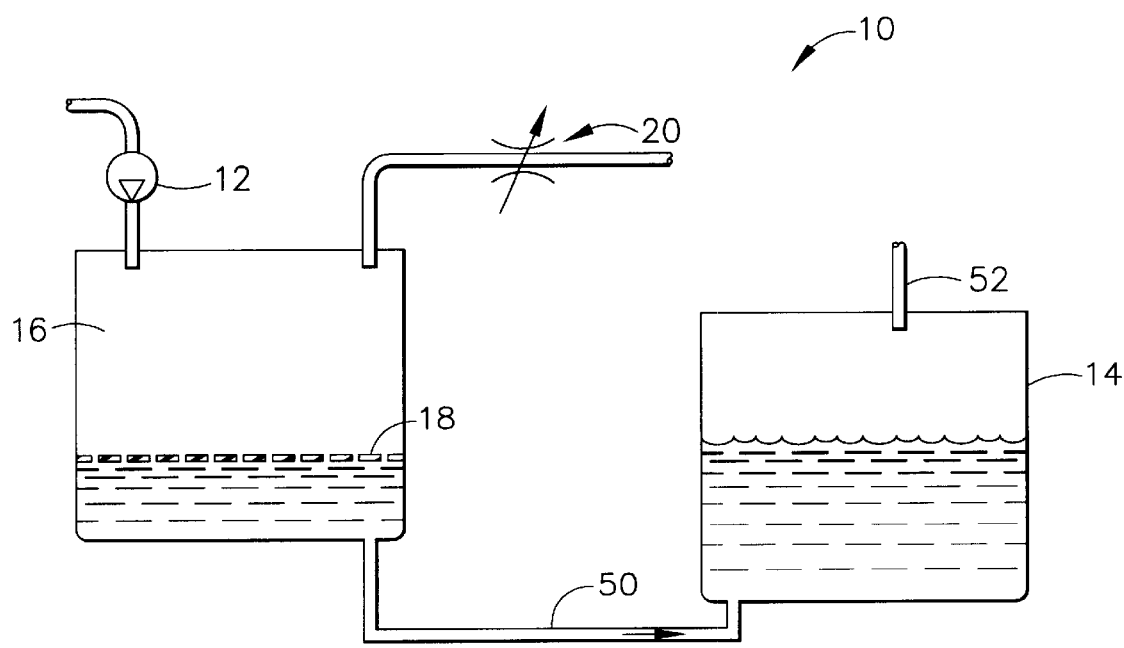
Figure 7:
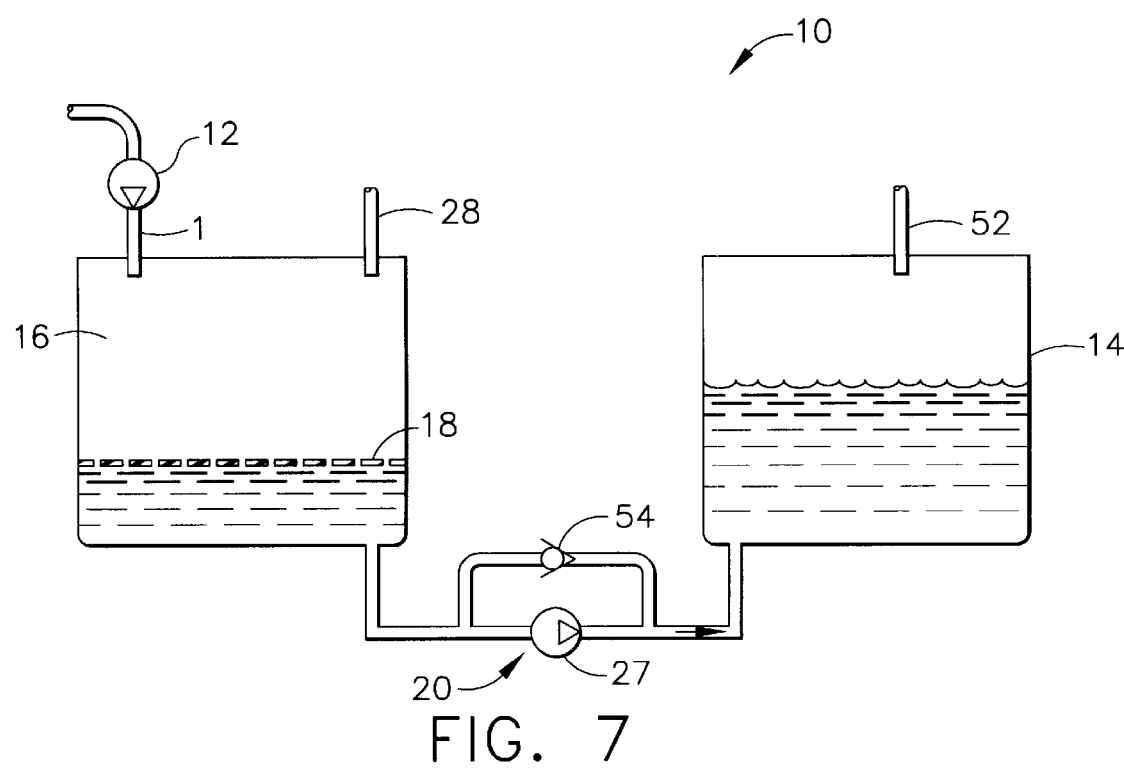

Referring now to the drawings, there are illustrated schematic block diagrams 10 of a portion of a fluid system in which foam is entering the system. The foam can be drawn into this portion of the fluid system by vacuum as shown in FIGS. 1, 2 and 4; or pumped in as shown in FIGS. 6 and 7. Foam is created in continuous ink jet fluid systems due to the fact that not all ink drops are used for printing. The unused ink drops are returned to the fluid system under vacuum through a catcher. The ink and air are mixed at the catcher and in the fluid lines which return the two phase flow (foam) to the ink supply tank 14, or, in FIG. 1, through the foam inlet port 1. If the foam is allowed to build up in the reservoir, some of the foam can be drawn out through the vacuum port and can be ingested into the vacuum pump. Ink in the vacuum pump will eventually ruin the vacuum pump. In co-pending, commonly assigned. U.S. patent application Ser. No. 09/211,015, now U.S. Pat. No. 6,234,621, totally incorporated herein by reference, foam is reduced by controlling the way in which fluid is returned into the tank. This is accomplished by means of an entrance chamber, a ramp for the ink to flow down, and baffles to protect the vacuum port. Foam buildup is reduced, helping to protect the vacuum pump. However, even with these foam reducing features, there are certain ink system situations which can produce foam build up and ingestion of foam into the vacuum pump.

The method by which the present invention protects the vacuum pump and eliminates foam is shown in FIG. 2. The foam enters in the two phase flow separation chamber 16 though the foam inlet port 1. The foam then comes into contact with the filter 18.

Figure 3:
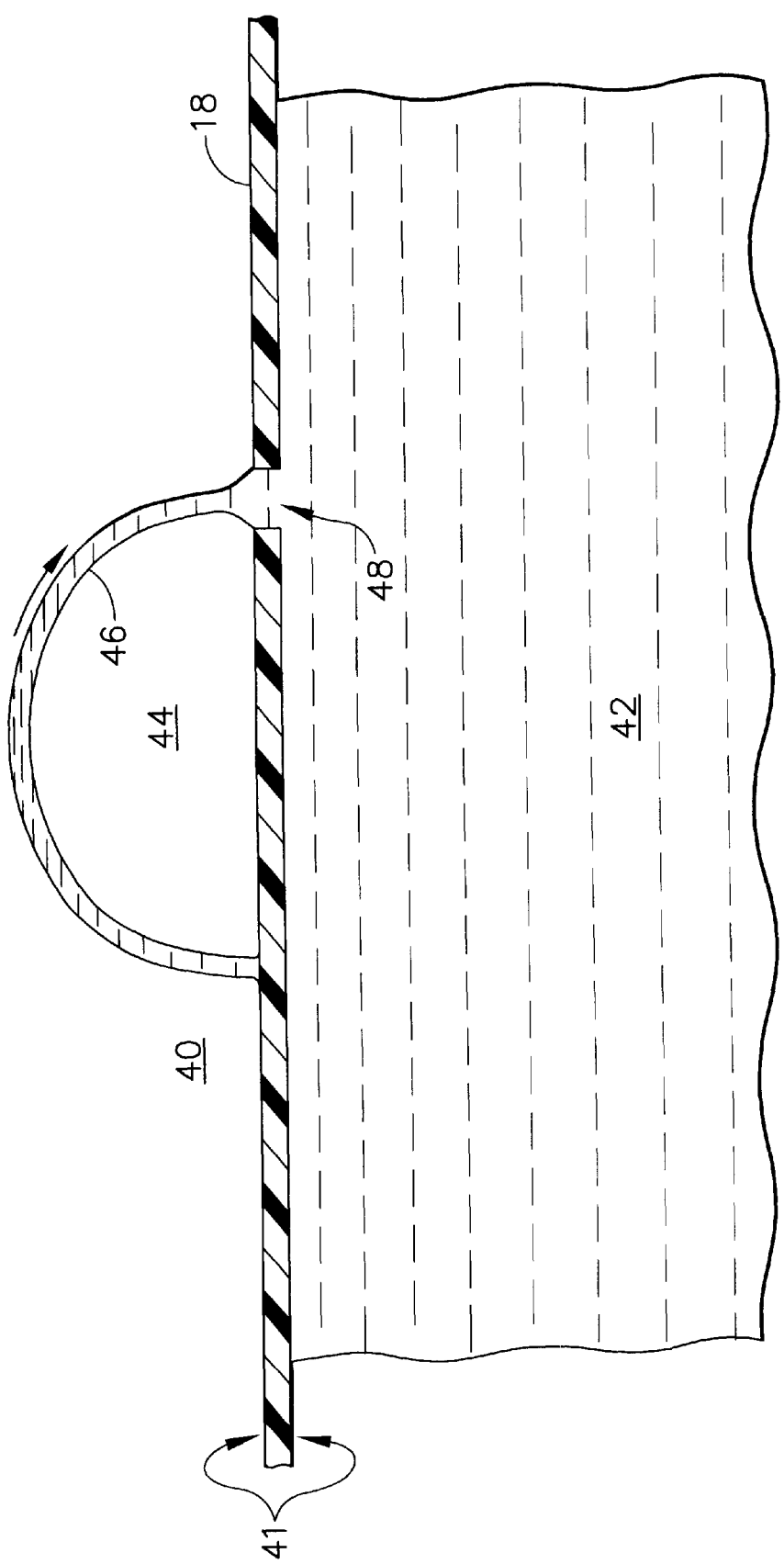
FIG. 3 illustrates how the foam is separated into a gas and liquid.

As illustrated in FIG. 3, foam and air exist on one side 40 of the filter 18, and liquid exists on the other side 42 of the filter 18. Therefore, a pressure difference exists across the filter. This pressure difference across the filter produces pressure on the walls of the foam bubbles 44, squeezing liquid out of the walls 46 and through the pore 48. Hence, when the filter material 18 is wetted so that each of the pores 48 is filled with liquid, there exists a critical pressure difference across the filter 18 below which air can not be passed through the pores of the filter. This critical pressure is called the bubble point of the filter. It is a function of the surface tension of the liquid, the wetting or contact angle of the liquid with the filter material and the pore size of the filter. The smaller the pore size the higher the bubble point.

While air cannot pass through the filter 18 with a pressure differential of less than the bubble point pressure, the liquid can flow freely through the filter. This flow of liquid through the filter is limited only by the viscous drag on the fluid as it flows through the filter pores. With an appropriate filter, having proper pore size, surface area of the filter and liquid wetting characteristics, any desired flow rate of liquid through the filter 18 can be obtained before the pressure drop across the filter exceeds the bubble point. A wetted filter therefore can block the flow of air while allowing liquid to readily pass through it.

FIG. 3 illustrates how such a filter or any other material with one or more pores can be used as a two phase flow separator. Consider that when the wall of a bubble 44 located over a pore of such a wetted filter 18, vacuum is applied to the lower side of the filter, producing a pressure drop of less than the bubble point across the filter. As the pressure difference across the filter at 41 is less than the bubble point, no air from the interior or the exterior of the bubble is drawn through the filter. Liquid from the bubble wall can be drawn through the filter by the pressure difference across the filter. The rate at which the liquid can be drawn through the filter pore 48 is higher than the rate at which the liquid can drain through the bubble wall to the entrance of the filter pore. As a result the bubble wall quickly thins and ruptures. This process is repeated for every bubble in contact with the filter. This rapid breakdown of the bubbles produces a collapse of the foam.

As foam is supplied to the foam reducing chamber 16 containing the wetted filter 18, the pressure difference across the filter 18 provides a means to extract the liquid portion 42 of the foam, separate from the air portion 40. In accordance with the present invention, a second path 22 is provided to remove the non-liquid part of the foam, i.e., the air or gas. The air removal port 7 from the foam reducing chamber 16 is preferably located away from the foam inlet port 1 through which foam enters the chamber to prevent foam from being sucked out the air removal port. Baffles (not shown) may also be employed to isolate the air removal port from the foam. This air removal port 22 is normally connected to some vacuum source 24. The vacuum source 24 not only serves to remove the air from the foam reducing chamber but it also maintains the vacuum in the chamber to pull the foamy liquid 50 into the chamber.

For proper operation of the two phase flow separator or foam reducing chamber of the present invention, a pressure difference must be maintained across the filter 18. One method for maintaining the pressure differential across the filter is the use of a differential vacuum regulator 20, as shown in FIG. 2. One such valve is a Fisher type Y611 valve. The regulator means in such valves varies the flow of air through the valve to produce the desired pressure differential. The use of a single vacuum source with a differential pressure regulating valve, allows the vacuum level in the foam reducing chamber to be varied as needed for different operating conditions while still maintaining the desired pressure differential across the filter. Another method of maintaining a pressure differential across the filter is by the use of one or more check valves in the place of the differential pressure regulator 20. The check valves need to have a cracking pressure below the bubble point of the filter material and be able to pass the maximum amount of required air or gas without creating an unacceptable amount of pressure drop.

Figure 5:
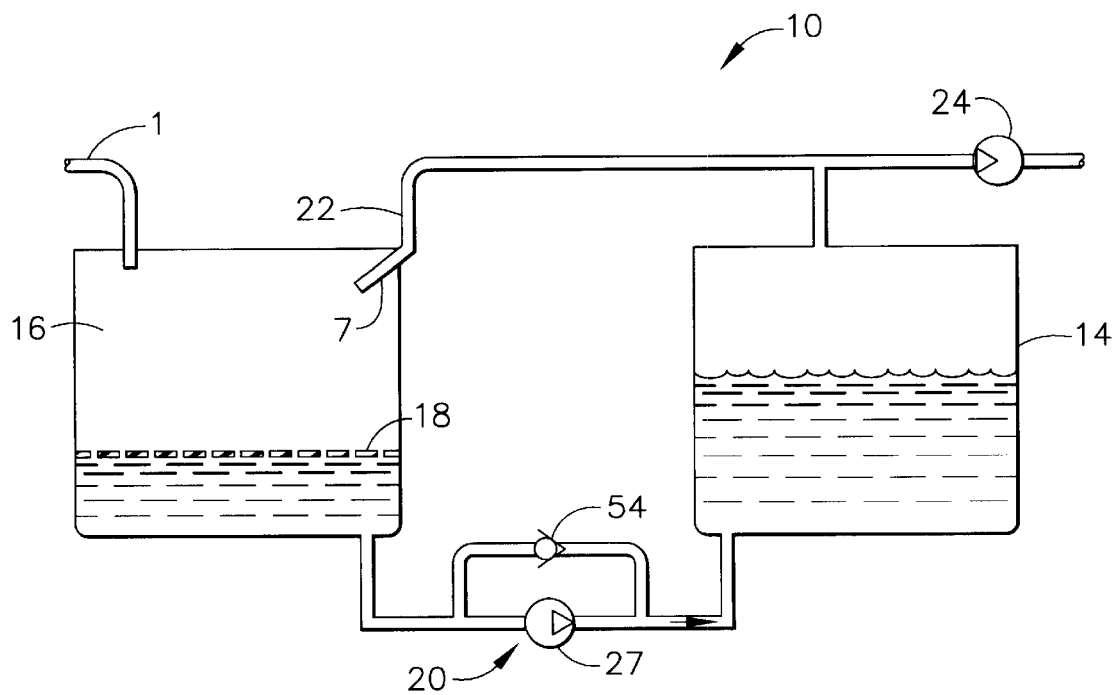

An alternative embodiment, rather than using a regulator valve to reduce the vacuum level on the air side of the filter, provides means to increase the vacuum on the liquid side of the filter. This might be done by means of an additional pump 26 to draw air out of the ink tank, with appropriate regulation means 20, as in FIG. 4. This could also be achieved by means of a liquid pump 27 between the liquid side of the filter and the ink tank, again with appropriate regulation means 20, as in FIG. 5. These options, while requiring the additional costs associated with the required pumps, eliminate the need for a regulator valve in the air line.

In systems where the foam contains a volatile liquid, the liquid should generally not be maintained under vacuum. For such systems where foamy liquids must be dealt with, it is preferable to use a liquid pump to pump the foamy mixture into the foam reducing chamber. FIGS. 6 and 7 illustrate two embodiments which are appropriate for such systems. The embodiment in FIG. 6 restricts the flow of air out of the foam reducing chamber 16, building up pressure on the foam and air side of the filter. With the liquid side of the filter connected directly to the vented 52 fluid tank, it is the pressure build up on the air side of the filter which forces the liquid through the filter. The pressure build up on the air side of the filter can be controlled by regulator valve means 20. In FIG. 7, a liquid pump is used to pump the liquid from the liquid side of the filter into the vented fluid tank. A bypass 54 with a check valve or regulator means 20 limits the pressure differential produced by the pump 27. Air leaves the foam reducing chamber through a simple vent 28.

In one preferred embodiment, a non-wetting material is employed as a filter on the air removal port 7 of the foam reducing chamber, shown in FIG. 2. Such a filter can prevent mist generated by the rupturing of the foam from being drawn out through the air removal port. As this filter is non-wetting, the ink tends not to fill and block the pores. Therefore, air is free to leave the foam reducing chamber through this filter material but liquids cannot leave through this port.

Although the differential regulation devices shown in this work are mainly mechanical, there are other devices which could be employed to gain the same results, some of which are servo controlled vacuum pumps, computer or mechanical controlled butterfly valves or other systems with electronically controlled feedback features.

Industrial Applicability and Advantages

The present invention is useful in the field of transport and accumulation of foamy liquids. The present invention is particularly useful in the field of ink jet printing, and has the advantage of providing a mechanical means for separating liquid and gas phases of foam in the fluid system of a continuous ink jet printer.

The invention has been described in detail with particular reference to certain preferred embodiments thereof, but it will be understood that modifications and variations can be effected within the spirit and scope of the invention.

What is claimed is:

1. A method for eliminating foam in a vacuum system comprising the steps of:
   allowing foam to enter in a two phase foam separation chamber;
   allowing the foam to come into contact with a filter material associated with the two phase foam separation chamber;
   wetting the filter material so that each pore of the filter material is filled with liquid;
   establishing a bubble point of the two phase foam separation chamber at a pressure difference below which air cannot be passed through the pores of the filter material while allowing a flow of liquid through the two phase flow separation chamber.

2. A method as claimed in claim 1 wherein the two phase foam separation chamber comprises a porous filter.

3. A method as claimed in claim 1 wherein the two phase foam separation chamber provides a first path for extracting a liquid portion of the foam and a second path for removing a non-liquid portion of the foam.

4. A method as claimed in claim 1 wherein the foam enters the two phase foam separation chamber through a foam inlet port.

5. A method as claimed in claim 4 further comprising the step of providing an air removal port.

6. A method as claimed in claim 5 wherein the air removal port is located away from the foam inlet port.

7. A method as claimed in claim 5 further comprising a vacuum source for connection to the air removal port.

8. A method as claimed in claim 7 wherein the vacuum source maintains vacuum in the two phase foam separation chamber.

9. A method as claimed in claim 1 further comprising the step of using a vacuum regulator to maintain the pressure difference across the two phase foam separation chamber.

* * * * *